United States Patent [19]

Laisney et al.

[11] Patent Number: 4,525,565
[45] Date of Patent: Jun. 25, 1985

[54] SINGLE COMPONENT ORGANOPOLYSILOXANE COMPOSITIONS CONTAINING SILANES WITH ACYLOXY OR KETONIMINOXY GROUPS AS CROSS LINKING AGENTS AND ORGANIC DERIVATIVES OF TITANIUM OR ZIRCONIUM AS CATALYSTS

[75] Inventors: Bernard Laisney; Michel Letoffe, both of Sainte-Foy-les-Lyon; Patrice Perrin, Lyons; Jean Ulrich, Saint-Syphorien d'Ozon, all of France

[73] Assignee: Rhone-Poulenc Specialites Chimiques, Courbevoie, France

[21] Appl. No.: 518,488

[22] Filed: Jul. 29, 1983

[30] Foreign Application Priority Data

Jul. 30, 1982 [FR] France ............................... 82 13505

[51] Int. Cl.³ ............................................. C08G 77/06
[52] U.S. Cl. ........................................ 528/17; 528/34; 528/901; 524/860; 524/863
[58] Field of Search ..................... 528/17, 901, 34; 524/860, 863

[56] References Cited

U.S. PATENT DOCUMENTS 3,240,731 3/1966 Nitzsche et al. ...................... 528/33
3,409,573 11/1968 Guinet et al. ........................ 528/17
4,273,698 6/1981 Smith, Jr. et al. .................... 528/32

FOREIGN PATENT DOCUMENTS 700572 12/1964 Canada ................................. 528/17
2080523 11/1971 France .
2264846 10/1975 France .
972900 10/1964 United Kingdom .
1344006 1/1974 United Kingdom .
1401804 7/1975 United Kingdom .
2026512 2/1980 United Kingdom .

Primary Examiner—Melvyn I. Marquis
Attorney, Agent, or Firm—Burns, Doane, Swecker & Mathis

[57] ABSTRACT

Provided are single component organopolysiloxane compositions which are hardenable at ambient temperatures and contain as the cross-linking agent silanes with hydrocarbonoyloxy (acyloxy) or ketoniminoxy groups. The compositions further comprise a cross-linking catalyst which is an organic derivative of titanium, e.g., a titanium ester, polytitanoxane, alkanolamine titanate, etc., or an organic derivative of zirconium, e.g., a zirconate, polyzirconate, etc. After cross-linking, the present compositions provide organopolysiloxane elastomers exhibiting good properties.

The organopolysiloxane compositions are referred to as "single component" to contrast them with the two-component organopolysiloxane compositions which are not storage stable and must therefore be handled in two separate packages, which problem is overcome by the present compositions.

9 Claims, No Drawings

SINGLE COMPONENT ORGANOPOLYSILOXANE COMPOSITIONS CONTAINING SILANES WITH ACYLOXY OR KETONIMINOXY GROUPS AS CROSS LINKING AGENTS AND ORGANIC DERIVATIVES OF TITANIUM OR ZIRCONIUM AS CATALYSTS

BACKGROUND OF THE INVENTION

1. Field of the Invention

The present invention concerns organopolysiloxane compositions which are stable in storage in the absence of humidity and harden into elastomers at ambient temperatures in the presence of humidity. More particularly, the present invention relates to organopolysiloxane compositions comprised of a mixture of essentially linear hydroxyl polysiloxanes; fillers; cross-linking agents chosen from silanes having bonded to the silicon atom hydrolyzable groups either of the hydrocarbonoyloxy type of the formula $R^1COO-$ (also designated by the term acyloxy), in which the symbol $R^1$ represents a hydrocarbon radical, or of the ketoniminoxy type of the formula $R_2^2C=NO-$, in which the symbols $R^2$, being either the same or different, represent an alkyl radical; and, hardening catalysts selected from among the organic derivatives of titanium or zirconium.

these organopolysiloxane compositions are designated single component in contrast to two-component organopolysiloxane compositions which also harden at ambient temperatures into elastomers, but are not stable in storage and must therefore be handled in two separate packages.

2. Description of the Prior Art

Single component organopolysiloxane compositions are known to the prior art. They are disclosed in numerous references and used in fields of application as varied as automobiles, electronics, the construction industry, and medicine. The catalysts used in the composition formulations generally are metallic salts of carboxylic acids, the metal of which may be lead, tin, nickel, cobalt, iron, cadmium, chromium, zinc, or manganese. The preferred metal is tin and the catalysts used are nearly always organic tin salts of carboxylic acids, such as dibutyl-tin diacetate or dilaurate. The choice is based on the ability of these organic tin salts to better accelerate the hardening of the compositions into elastomers.

Known single component compositions prepared with cross-linking agents consisting of silanes having hydrolyzable hydrocarbonoyloxy groups of the formula $R^1COO-$, with $R^1$ representing a hydrocarbon radical and catalysts consisting of organic tin salts of carboxylic acids, are disclosed, for example, in U.S. Pat. Nos. 3,077,456, 3,382,205, 3,701,753, 3,957,714, 4,115,356 and 4,273,698; and FR No. 2,429,811 and FR No. 2,459,820. Other known single component compositions prepared from cross-linking agents consisting of silanes with hydrolyzable ketoniminoxy groups of the formula $R^2C=NO-$, with $R^2$ representing an alkyl radical, and the same organic tin salts of carboxylic acids are disclosed, in particular, in U.S. Pat. Nos. 3,678,003 and 3,986,999; and, FR No. 2,415,132 and FR No. 2,421,195. Sometimes the organic tin salts of carboxylic acids are not used as such, but are used in the form of their reaction products with titanium esters, e.g., compare U.S. Pat. No. 3,409,753.

It is known that organic tin salts have the disadvantage of being toxic. For this reason, they cannot be introduced in single component compositions which are intended, after being hardened to elastomers, to be in contact with food products, pharmaceutical products or even prostheses. Furthermore, with the use of single component compositions constantly increasing, and in particular in the industrial applications of grouting, the embedding of electric and electronic equipment and the adhesive bonding of pieces of any kind, the degradation over time of the elastomers resulting from these compositions to thereby release tin salts will clearly contribute to the pollution of the environment.

There are additional families of catalysts that may be used in single component organopolysiloxane compositions, such as the family of organic derivatives of titanium. The use of titanium compounds is well known in compositions using only silanes containing hydrolyzable groups of the hydrocarbonoxy type, and more specifically alkoxy groups, as cross-linking agents. See, for example U.S. Pat. Nos. 3,334,067, 4,100,129, 4,102,852 and 4,273,698. These titanium catalysts are thus reserved for organopolysiloxane compositions with cross-linking agents containing so-called neutral alkyl groups, while for the so-called acid cross-linking agents carrying hydrocarbonoyloxy groups, tin salts are recommended. U.S. Pat. No. 4,273,698, for example, illustrates this different use well. Therein it is recommended, e.g., at column 1, lines 45–50 and column 7, lines 1 to 6 and 24 to 25, to use catalysts consisting of tin salts of carboxylic acids with cross-linking agents chosen from among silanes containing hydrocarbonoyloxy groups, and catalysts consisting of titanium chelates with cross-linking agents chosen from among silanes carrying alkoxy groups.

Certainly, one finds in the chemical literature indications suggesting compositions formulated by the mixture of hydroxyl organopolysiloxanes or containing hydrolyzable groups incorporating acyloxy (and more specifically acetoxy) groups, silanes, containing the same hydrolyzable groups and organic derivatives of titanium. Such compositions, however, are not exemplified and it is difficult to derive from the descriptions a clear illustration of the combinations consisting of silanes containing acyloxy or ketoniminoxy groups and organic titanium derivatives.

Compare, Belgian Pat. No. 744,184 wherein an interpretation of the broadest general formula described provides the possibility of a combination of an organotriacetoxysilane with a titanium chelate, the organotriacetoxysilane being introduced in a proportion of 0.1 to 20 parts and the titanium chelate in a proportion of 0.1 to 30 parts per 100 parts of a $\alpha,\omega$-dihydroxydiorganopolysiloxane.

In using organic zirconium derivatives as hardening catalysts, it is known to introduce in single component organopolysiloxane compositions zirconium salts of carboxylic acids. However, this introduction does not make it possible by itself to obtain a significant acceleration of the time to harden the compositions into elastomers. To obtain shorter durations, it is necessary to add an organic tin salt of a carboxylic acid, such as dibutyltin dilurate or dimethyl-tin neodecanoate. Compare, Belgian Pat. No. 877 845.

In view of the foregoing, the need arose to find a nontoxic, non-polluting catalytic system effective in small quantities, which exhibits an improved catalytic activity and permits one to obtain shorter elastomer cross-linking times for organopolysiloxane elastomers which have satisfactory mechanical properties. The present invention achieves this objective.

SUMMARY OF THE INVENTION

It has now been discovered that a large group of compounds comprising organic derivatives of titanium and organic derivatives of zirconium, with the exception of the carboxylic acid salts of zirconium, can advantageously replace the tin salts of a carboxylic acid, and more precisely those of organo-tin, as hardening catalysts of single component organopolysiloxane compositions which comprise silanes carrying hydrocarbonoyloxy or ketoniminoxy groups as cross-linking agents. In particular, the organic derivatives of titanium and zirconium may be used in lower proportions than those of the tin salts, for example at least two times lower. Furthermore, they are significantly less toxic, primarily the titanium derivatives vis-a-vis the organo-tin salts, as shown by an examination of the chapters devoted to titanium, zirconium, and tin in the work by E. BERMAN entitled "Toxic Metals and Their Analysis", published by HEYDEN (1980).

More specifically, an objective of the present invention is to provide single component organopolysiloxane compositions which are stable in storage in the absence of water moisture, which harden into elastomers at ambient temperatures in the presence of water moisture, and which comprise a mixture of the following components:

(A) 100 parts of a polysiloxane consisting essentially of a α,ω-dihydroxydiorgano-polysiloxane polymer having a viscosity of 700 to 1,000,000 mPa.s at 25° C., and comprising a succession of diorganosiloxy groups of the formula $R_2SiO$, in which the symbol R, being identical or different, represent hydrocarbon radicals having 1 to 8 carbon atoms, which is optionally substituted by halogen atoms or cyano groups, (B) 2 to 25 parts of a cross-linking agent of the formula $R_aSi(OCOR^1)_{4-a}$ or of the formula $R_{a'}Si(ON=CR^2_2)_{4-a'}$, wherein the symbols R have the significance given under (A) i.e., a hydrocarbon radical having from 1 to 8 carbon atoms and which is optionally substituted by halogen atoms or cyano groups, the symbol $R^1$ represents a hydrocarbon radical without aliphatic unsaturation and having from 1 to 15 carbon atoms, the symbols $R^2$, being identical or different, also represent alkyl radicals having from 1 to 8 carbon atoms, and the symbols a and a' represent zero or one, (C) 0.0004 to 0.095 parts of a hardening catalyst, and (D) 5 to 150 parts of mineral fillers.

The subject composition is further characterized in that the hardening catalyst (C) is either an organic derivative of titanium or an organic derivative of zirconium chosen from among the following compounds:

(i) the organic derivatives of titanium, which comprise compounds [hereinafter referred to as $C_1$] having at least one organosilicon radical bonded to each titanium atom by a Ti—O—Si bond, with the other possibly remaining valences of the titanium atom being satisfied by radicals of the group comprising organic radicals bonded to the titanium atom by Ti—O—C bonds, hydroxyl radicals, oxygen atoms via Ti—O—Ti bonds, and/or chelation bonds; or compounds [hereinafter referred to as $C_2$] which contain for every titanium atom at least one organic radical bonded to said atom by a Ti—O—C bond, with the remaining valences of the titanium atom being satisfied by radicals from the group comprising hydroxyl radicals, oxygen atoms via Ti—O—Ti bonds and/or chelation bonds; or, (ii) organic derivatives of zirconium, which comprise compounds having at least one organic radical bonded to each zirconium atom by a Zr—O—C bond, but where there is no Zr—OCO-bond orginating from a carboxylic acid, with the other remaining valences of the zirconium atom being satisfied by radicals from among the group comprising hydroxyl radicals, oxygen atoms via a Zr—O—Zr bond and/or chelation bonds.

Chelation bonds are generally used to connect a titanium atom with a donor atom or group. In general, the chelation bond is often effected by a heteroatom, for example, such as an oxygen or nitrogen atom. Chelation bonds are provided for example by β-diketonic or β-ketoester groups.

DETAILED DESCRIPTION OF THE INVENTION

More particularly, the polysiloxanes that may be used in formulating the composition of the present invention consist essentially of α,ω-dihydroxydiorganpolysiloxane polymers (A), having a viscosity of from 700 to 1,000,000 mPa.s at 25° C., and more preferably from 1,000 to 700,000 mPa.s at 25° C., which comprise a succession of diorganosiloxy groups of the aforecited formula $R_2SiO$, and being terminated at each end of the chain by a hydroxy group. These polysiloxanes may further contain a succession of monoorganosiloxy groups of the formula $RSiO_{1.5}$ and/or siloxy groups of the formula $SiO_2$, in a maximum proportion of 2% with respect to the number of diorganosiloxy groups.

The hydrocarbon radicals, optionally substituted by halogen atoms or cyano groups, and which are represented by the symbol R, may be suitably selected from among the following, i.e., alkyl and halogenalkyl radicals having from 1 to 8 carbon atoms, such as the methyl, ethyl, n-propyl, isopropyl, n-butyl, n-pentyl, n-hexyl, ethyl-2-hexyl, n-octyl, trifluoro-3,3,3-propyl, trifluoro-4,4,4-butyl, and pentafluoro-4,4,4,3,3-butyl radicals; the cycloalkyl and halogenocycloalkyl radicals having from 4 to 8 carbon atoms, such as the cyclopentyl, cyclohexyl, methylcyclohexyl, difluoro-2,3-cyclobutyl, and difluoro-3,4-methyl-5-cycloheptyl radicals;

alkenyl radicals having from 2 to 4 carbon atoms, such as the vinyl, allyl, and butene-2-yl radicals;

aryl and halogenaryl radicals having from 6 to 8 carbon atoms, such as the phenyl, tolyl, xylyl, chlorophenyl, dichlorophenyl, and trichlorophenyl radicals;

cyanoalkyl radicals the alkyl links of which have 2 to 3 carbon atoms, for example, such as the β-cyanoethyl and cyanopropyl radicals.

As preferred examples of the groups represented by the $R_2SiO$ formula, the following formulae are noted:
$(CH_3)_2SiO$
$CH_3(CH_2=CH)SiO$
$CH_3(C_6H_5)SiO$
$(C_6H_5)_2SiO$
$CF_3CH_2CH_2(CH_3)SiO$
$NC—CH_2CH_2(CH_3)SiO$
$NC—CH(CH_3)CH_2(CH_2=CH)SiO$, and
$NC—CH_2CH_2CH_2(C_6H_5)SiO$.

It should be understood that in accordance with another embodiment of the present invention, the polymer (A) may comprise a mixture of α,ω-dihydroxyldiorganopolysiloxanes differing in molecular weight and/or the nature of the grops bonded to the silicon atom.

Suitable $\alpha,\omega$-dihydroxyorganopolysiloxane polymers (A) are commercially available. Furthermore, they are easily prepared. One of the most contemporary production methods consists of polymerizing in a first step the diorganocyclopolysiloxanes with the aid of catalytic quantities of an alkaline or acid agent, and then treating the polymers with a calculated quantity of water. See, for example, FR No. 1,134,005, FR No. 1,198,749, and FR No. 1,226,745. The addition of water, which increases with declining viscosities of the polymers to be prepared, may be replaced entirely or partially by $\alpha,\omega$-dihydroxydiorganopolysiloxane oils of low viscosity, for example from 5 to 200 mPa.s at 25° C., which have a high hydroxyl radicals content, for example, from 3 to 14%.

In a second phase the polymers are then isolated by eliminating at a temperature generally higher than 100° C. and under a pressure preferably lower than atmospheric the diorganocyclopolysiloxanes balancing the reaction, together with the other low molecular polymers formed during the reaction. It is recommended to neutralize the alkaline or acid agents used as catalysts prior to the distillation of the volatile products.

The preferred (A) polymers are $\alpha,\omega$-dihydroxydimethylpolysiloxanes consisting essentially of successive groups of the formula $(CH_3)_2SiO$. However, they may contain a maximum of 10% by mole of groups of the formula $CH_3(CH_2=CH)SiO$ and/or $(C_6H_5)_2SiO$.

The cross-linking agents (B) are employed in a proportion of 2 to 25 parts, preferably from 3 to 20 parts, per 100 parts of the $\alpha,\omega$-dihydroxydiorganopolysiloxanes (A). They correspond to the aforecited formulae $R_aSi(OCOR^1)_{4-a}$ and/or $R_aSi(ON=CR^2{}_2)_{4-a'}$.

The significance of the different symbols of these formulae has been given earlier with R representing the radicals as defined before.

The symbol $R^1$ represents hydrocarbon radicals, without aliphatic unsaturation, chosen from among:
alkyl radicals having from 1 to 15 carbon atoms, such as
 the methyl, ethyl, n-propyl, n-butyl, n-pentyl, ethyl-1-pentyl, n-hexyl, n-octyl, neodecyl, n-decyl n-dodecyl, and n-pentadecyl radicals,
cycloalkyl radicals having from 5 to 6 nuclear carbon atoms, such as the cyclopentyl and cyclohexyl radicals,
aryl radicals having from 6 to 8 carbon atoms such as the pentyl, tolyl, and xylyl radicals.

The symbols $R^2$ represent alkyl radicals having from 1 to 8 carbon atoms, such as the methyl, ethyl, n-propyl, n-butyl, n-pentyl, ethyl-1-pentyl, n-hexyl, or n-octyl radicals.

Examples of suitable cross-linking agents (B) are the following:
Formula $R_aSi(OCOR^1)_{4-a}$ [hereinafter referred to as $F_1$]:
$CH_3Si(OCOCH_3)_3$,
$C_2H_5Si(OCOCH_3)_3$,
$CH_2=CHSi(OCOCH_3)_3$,
$C_6H_5Si(OCOCH_3)_3$,
$CH_3Si[(C)CH(C_2H_5)(CH_2)_3—CH_3]_3$,
$CF_3CH_2CH_2Si(OCOC_6H_5)_3$,
$CH_3Si(OCOCH_3)_2OCOCH(C_2H_5)(CH_2)_3CH_3$,
$CH_3COOSi[OCOCH(C_2H_5)(CH_2)_3CH_3]_3$,
Formula $R_aSi(ON=CR^2{}_2)_{4-a'}$ [hereinafter referred to as $F_2$]
$CH_3Si[ON=C(CH_3)_2]_3$,
$CH_3Si[ON=C(CH_3)C_2H_5]_3$,
$CH_2=CHSi[ON=C(CH_3)C_2H_5]_3$,
$C_6H_5Si[ON=C(CH_3)_2]_3$,
$CH_3Si[ON=C(C_2H_5)(CH_2)_3CH_3]_3$,
$CH_3Si[ON=C(CH_3)CH(C_2H_5)(CH_2)_3CH_3]_3$,
$(CH_3)_2C=NOSi[ON=C(CH_3)C_2H_5]_3$.

Silanes, each carrying only two hydrolyzable groups, may be combined with these cross-linking agents. These silanes have the formula $R_2{}^3Si(OCOR^1)_2$ [hereinafter referred to as $F_3$] and $R_2Si(ON=CR^2{}_2)_2$ [hereinafter referred to as $F_4$] in which the symbols R, $R^1$ and $R^2$ are as defined for the formulae ($F_1$) and ($F_2$) and the symbol $R^3$ has the significance of the symbols R or represent tertiobutoxy radicals of the formula $(CH_3)_3CO—$.

The foregoing silanes may be suitably exemplified by the following:
Formula $F_3$:
$(CH_3)_2Si(OCOCH_3)_2$,
$[(CH_3)_3CO]_2Si(OCOCH_3)_2$,
$CH_2=CH(CH_3)Si(OCOCH_3)_2$,
$(C_6H_5)_2Si(OCOCH_3)_2$,
$(CH_3)_2Si[OCOCH(C_2H_5)(CH_2)_3CH_3]_2$,
Formula $F_4$:
$(CH_3)_2Si[ON=C(CH_3)_2]_2$,
$CH_3(CH_3=CH)Si[ON=C(CH_3)C_2H_5]_2$,
$(CH_3)_2Si[ON=C(CH_3)CH(C_2H_5)(CH_2)_3(CH_3)]_2$.

When employed, it is preferred to use a molar quantity of the silanes ($F_3$) and ($F_4$) such that each of their mixtures with the cross linking agents (B) contains at least 2.5 hydrolyzable group per silicon atom. It should be understood that every mixture contains necessarily hydrolyzable groups of the same chemical nature. There will thus be combinations of silanes of the formulae ($F_1$) and ($F_3$) and silanes of the formulae ($F_2$) and ($F_4$).

The principal role of the silanes of formulae ($F_3$) and ($F_4$) is that of joining the chains of the $\alpha,\omega$-dihydroxydiorganopolysiloxane polymers (A), which makes it possible to obtain elastomers with good physical properties from compositions containing polymers (A) having a low viscosity, for example from 700 to 5,000 mPa.s at 25° C.

The hardening catalysts (C) are used in a proportion of 0.0004 to 0.095 parts, and preferably from 0.0008 to 0.08 parts, per 100 parts of the $\alpha,\omega$-dihydroxydiorganopolysiloxanes (A). They are chosen, as mentioned hereinabove, from among the organic derivatives of titanium ($C_1$) and ($C_2$) and the organic derivatives of zirconium.

The titanium derivatives ($C_1$) necessarily contain for each titanium atom at least one organosilicon radical bonded by a Ti—O—Si bond, with the remaining valences being satisfied by organic radicals bonded by Ti—O—C bonds, hydroxy radicals, oxygen atoms via Ti—O—Ti bonds, or by chelation bonds. The ($C_1$) derivatives include in particular those responding to the following general formula [hereinafter referred to as $F_5$]:

$$(G_3SiO)_{4-x}Ti(G')_x$$

wherein
the symbols G, being identical or different, represent hydrocarbon radicals having from 1 to 8 carbon atoms, alkoxy radicals having from, 1 to 4 carbon atoms, and $\beta$-methoxyethoxyl radicals, the symbols G' represent radicals of the group formed by those of the formulae $(OCH_2CH_2)_bOR^4$, $-OC(Q')=C(R^5)COQ$.

Furthermore, two G' radicals may together constitute the divalent radical of the formula:

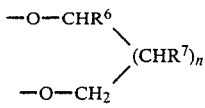

As the foregoing divalent radical is attached by its two valences to the titanium atom, the entirety represents a heterocycle.

In these 3 formulae of the symbol G':
the symbol $R^4$ can represent an alkyl radical having from 1 to 12 carbon atoms,
the symbol b represents zero or one, with the proviso that when the symbol b represents zero, the alkyl radical $R^4$ has from 2 to 12 carbon atoms and when the symbol b represents 1, the alkyl radical has from 1 to 3 carbon atoms,
the symbol Q represents a hydrogen atom, an alkyl radical having from 1 to 4 carbon atoms, a phenyl radical, an alkyl radical having from 1 to 5 carbon atoms, or a dialkylamino radical, the alkyl groups bonded to the nitrogen atom of which have from 1 to 4 carbon atoms,
the symbol $R^5$ represents a hydrogen atom, a methyl radical, a chloromethyl radical, or an acetyl radical,
the symbol Q' represents an alkyl radical having from 1 to 5 carbon atoms, or a chloromethyl radical,
the symbols $R^6$ or $R^7$, which can be identical or different, represent hydrogen atoms, or methyl radicals,
the symbol n represents zero, one or two, and
the symbol x represents zero, one, two or three.

It should be noted that the silyl titanates of formula $F_5$ may contain in addition to the covalent bonds, chelating bonds (which are not shown). Such a case occurs when the symbol G' represents a β-diketonic or β-ketoester group.

As an illustration, the following hydrocarbon radicals represented by the symbols G may be noted:
alkyl radicals having from 1 to 8 carbon atoms, such as the methyl, ethyl, n-propyl, n-butyl, ethyl-2-hexyl, and n-octyl radicals,
alkenyl radicals having 2 to 4 carbon atoms, such as vinyl, allyl, and butene-2-yl radicals, and
aryl radicals having from 6 to 8 carbon atoms such as phenyl, tolyl, and xylyl radicals.

As an illustration of suitable alkoxy radicals having from 1 to 4 carbon atoms represented by the symbols, the methoxyl, ethoxyl, n-propoxyl and n-butoxyl may be noted.

The alkyl radicals having from 1 to 12 carbon atoms represented by the symbol $R^4$ may be exemplified by the methyl, ethyl, isopropyl, n-propyl, n-butyl, isobutyl, ethyl-2-hexyl, n-octyl, n-decyl, and n-dodecyl radicals.

As an illustration of the radical Q, which represent respectively:
(i) alkyl radicals containing from 1 to 4 carbon atoms,
(ii) alkoxy radicals containing from 1 to 5 carbon atoms, and
(iii) dialkylamino groups the alkyl radicals of which contain from 1 to 3 carbon atoms, the following radicals may be accordingly noted
(i) methyl ethyl, n-propyl and n-butyl radicals,
(ii) methoxyl, ethoxyl, n-propoxyl, n-butoxyl, and n-pentoxyl radicals,
(iii) groups of the formulae $-N(CH_3)_2$, $-N(C_2H_5)_2$, and $-N(nC_3H_7)_2$.

As an example of the alkyl radicals having from 1 to 5 carbon atoms represented by the symbols Q', the methyl, ethyl, n-propyl, n-butyl, and n-pentyl radicals may be noted.

As preferred examples of the titanium derivatives ($C_1$), which illustrate the various combinations of the symbols of the formula ($F_5$), the following may be mentioned:

| | |
|---|---|
| x = zero | $Ti[OSi(CH_3)_3]_4$ |
| | $Ti[OSi(CH_3)_2CH=CH_2]_4$ |
| x = 1 | $(nC_4H_9)Ti[OSi(CH_3)_3]_3$ |
| | $CH_3OCH_2CH_2OTi[OSi(CH_3)_3]_3$ |
| | $C_2H_5OTi[OSi(CH_3)_2=CH]_3$ |
| x = 2 | $(nC_4H_9O)_2Ti[OSi(CH_3)_3]_2$ |
| | $[C_2H_5OCOCH=C(CH_3)O]_2Ti[OSi(CH_3)_2C_6H_5]_2$ |
| | 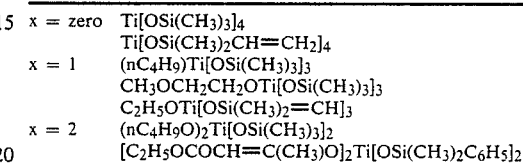 |
| x = 3 | $[CH_3CO-CH=C(CH_3)O]_3TiOSi(OCH_2CH_2OCH_3)_3$ |
| | $[CH_3(CH_2)_3CH(C_2H_5)CH_2O]_3TiOSi(CH_3)_3$ |
| | $(iso\text{-}C_3H_7O)_3TiOSi(CH=CH_2)(OCH_3)_2$ |

The $C_1$ compounds may also comprise compounds having a formula similar to $F_5$, but in which the radical $-O-CO-R_8$, with $R_8$ representing a hydrocarbon radical having from 1 to 20 carbon atoms, appears for $(G_3SiO)$ or G'.

The preparation of the titanium derivatives of formula ($F_5$) is described more particularly in the work by R. FELD and P. L. COWE, *The Organic Chemistry of Titanium*, pages 96 to 108, published by Butterworths (1965). Note also FR No. 1,359,396.

In the preparation, a silane generally carrying at least one acyloxy radical or a hydroxyl radical is placed into contact with a tetraorganotitanium compound, the organic radicals of which are bonded to the titanium atom by Ti—O—C bonds (which may be designated as tetraorganooxytitanium). It is also possible to heat a mixture of an oxide of a diorganooxytitanium and an alkyl silicate. It is preferable, having in order to avoid the formation of large amounts of polymerized products, to add an organosilicon compound progressively into the reactor containing the entirety of the organic titanium derivative.

The hardening catalysts further comprise the organic titanium derivatives designated hereinabove as $C_2$, and which, in contrast to the $C_1$ derivatives, are free of organosilicon radicals. These $C_2$ compounds carry per titanium atom at least one organic radical bonded by a Ti—O—C bond, with the remaining valences being satisfied by radicals from among hydroxyl radicals, oxygen atoms via TiO-Ti bonds, or chelation bonds.

The ($C_2$) derivatives correspond preferentially to the formula $(G')_yTi(OCOR^8)_{4-y}$ [hereinafter referred to as $F_6$] wherein:
the symbols G' have the same significance as the symbols G' of formula $F_5$, i.e., they thus represent the following radicals:
$(OCH_2CH_2)_bOR^4$
$OC(Q')=C(R^5)COQ$

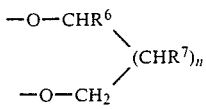

the symbol y represents an integer or fractional number from zero to four, and the symbol $R^8$ represents a hydrocarbon radical having from 1 to 20 carbon atoms.

As an illustration of suitable hydrocarbon radicals represented by the symbol $R^8$, the following may be noted:

alkyl radicals having from 1 to 20 carbon atoms, such as the methyl, ethyl, n-butyl, ethyl-2-pentyl, n-octyl, n-decyl, n-dodecyl, n-octadecyl, and n-eicosyl radicals, alkenyl radicals having from 2 to 4 carbon atoms such as the vinyl, methyl-1-vinyl, allyl, and methyl-2-allyl radicals, and aryl radicals with a single benzene nucleus having from 6 to 8 carbon atoms, such as the phenyl, tolyl, and xylyl radicals.

$C_2$ titanium derivatives illustrating a variety of different $F_6$ compounds are suitably exemplified by the following:

| | |
|---|---|
| y = 0 | Ti(OCO—nC$_{17}$H$_{35}$)$_4$ |
| | Ti(OCOCH$_2$CH$_3$)$_4$ |
| y = 0.7 | [(CH$_3$)$_2$CHO]$_{0.7}$Ti[OCOC(CH$_3$)=CH$_2$]$_{3.3}$ |
| y = 1 | (CH$_3$)$_2$CHO—Ti[OCOCH(C$_2$)$_3$CH$_3$]$_3$ |
| | nC$_4$H$_9$OTi(OCO—nC$_{17}$H$_{35}$)$_3$ |
| | (CH$_3$)$_2$CHO—Ti[OCOC(CH$_3$)=CH$_2$]$_3$ |
| y = 2 | [(CH$_3$)$_2$CHO]$_2$Ti[OCOCH$_3$]$_2$ |
| | (C$_2$H$_5$O)$_2$Ti(OCOC$_6$H$_5$)$_2$ |
| | (nC$_4$H$_9$O)$_2$Ti(OCOCH=CH$_2$)$_2$ |
| y = 3 | (C$_2$H$_5$O)$_3$TiOCOCH$_3$ |
| | (C$_2$H$_5$O)$_3$TiOCOC$_6$H$_5$ |
| y = 4 | |

(i) with a chelating agent (chelate bonds are not shown)

(nC$_4$H$_9$O)$_2$Ti[OC(CH$_3$)=CH—COCH$_3$]$_2$
[(CH$_3$)$_2$CHO]$_3$TiOC(CH$_3$)=CH—COOC$_2$H$_5$

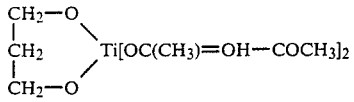

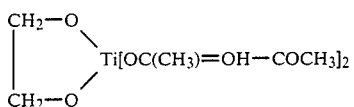

(ii) without a chelating agent
(nC$_4$H$_9$O)$_4$Ti
(C$_2$H$_5$O)$_4$Ti
[(CH$_3$)$_2$CHO]$_4$Ti
(nC$_3$H$_7$O)$_4$Ti
(nC$_8$H$_{17}$O)$_4$Ti
(CH$_3$OCH$_2$CH$_2$O)$_4$Ti
[CH$_3$(CH$_2$)$_3$CH(C$_2$H$_5$)CH$_2$O]$_4$Ti The preparation of the titanium derivatives $C_2$ of the formula $F_6$ is described, for example, in the aforecited work by R. FELD and P. L. COWE, entitled *The Organic Chemistry of Titanium*, as well as in the work by D. C. BRADELEY, R. C. MEHROTRA and D. P. GAUR entitled *METAL ALKOXIDES* published by Academic Press (1978), and FR No. 1, 359, 396.

Note also Belgium Pat. No. 841 732. The patent concerns in particular the preparation of alkoxyacyloxytitanes by the progressive introduction of carboxylic acid into a reactor containing a tetraalkoxytitanium compound heated to a temperature generally higher than 100° C. The alcohol is eliminated at the end of the reaction.

Another reference of note is FR No. 2, 121 289. This publication concerns the preparation of titanium chelates of the type of the aforecited formula:

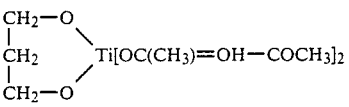

by contacting an alkanediol with a titanium chelate carrying alkoxyl radicals at a low temperature (less than 100° C.).

The organic titanium derivatives $C_2$ may further comprise polytitaniumoxanes, principally with acyloxy radicals. These compounds are low molecular weight polymers, not exceeding significantly 20 units, formed by a succession of units of the following formula [hereinafter referred to as $F_7$].

$$—Ti(OCOR^8)_{y'}[(OCH_2CH_2)_bOR^4]_{2-y'}O—$$

in which the symbols $R^8$, $R^4$ and b have the significance of the symbols $R^8$, $R^4$ and b of the formula $F_6$ and the symbol y' represents 1 or 2.

As examples of suitable units of formula $F_7$, those of the following formulae may be cited:

$$—Ti[OCH(CH_3)_2][OCOCH(C_2H_5)(CH_2)_3CH_3]O—$$

$$—Ti[OCOCH(C_2H_5)(CH_2)_3CH_3]_2O—$$

$$—Ti(OCO\ nC_{17}H_{35})_2O—$$

The foregoing compounds are prepared in two stages:

(i) first, mixtures consisting of compounds of the formula Ti[(OCH$_2$CH$_2$)$_n$—OR$^4$]$_4$ [hereinafter referred to as $F_8$] and organic acids of the formula $R^8COOH$ are heated to a temperature preferably within the range of from 50° to 150° C.

(ii) Subsequently, the volatile compounds generated, consisting of alcohols of the formula $R^4O(CH_2CH_2O)_bH$ and esters of the formula $R^8CO(OCH_2CH_2)_bOR^4$, are eliminated. Generally, 1 to 3 moles of organic acid are used per one mole of titanium ester. Such a mode of operation is disclosed in U.S. Pat. No. 2,621,193.

The precise structure of the polymers obtained is not known. These polymers probably consist, as a function of the molar ratio of the reagents employed (organic acid/titanium ester), either essentially of units of the formula:

$$Ti(OCH_2CH_2)_bOR^4—(OCOR^8)O—$$

or the mixture of units of the formula:

$$Ti(OCH_2CH_2)_bOR^4—(OCOR^8)O—$$

and units of the formula —Ti(OCOR$^8$)$_2$O— or essentially of units of the formula:

$$Ti(OCOR^8)_2O$$

The organic titanium derivatives C$_2$ may further comprise alkanolamine titanates resulting most frequently from the reaction of titanium esters of the aforecited formula Ti[(OCH$_2$CH$_2$)$_b$OR$^4$]$_4$ with hydroxyalkylamines such as the ethanolamines. Among the suitable ethanolamines are more specifically triethanolamine, diethanolamine and methyldiethanolamine.

These alkanolamines are in actuality poorly defined products. They are prepared generally by heating or by allowing to stand at ambient temperatures mixtures formed of titanium esters and the alkanolamines described hereinabove, in a proportion, for example, of from 1 to 4 moles of alkanolamines per 1 mole of titanium esters. It is preferable to eliminate the alcohol generated of the formula of R$^4$O(CH$_2$CH$_2$O)$_b$H.

Processes of this type are discussed in British No. 755,728 and FR No. 1,087,874 and FR No. 1,148,113.

The titanium derivatives C$_1$ and C$_2$ may also include the products of the partial hydrolysis of the compounds of formulae F$_5$ and F$_6$. These products of partial hydrolysis are polymers comprising linear structures and/or more complex structures, as indicated in the aforecited work by R. Feld and P. L. COWE, *The Organic Chemistry of Titanium*, at pages 25 to 31 and 101, and in the aforementioned work by D. C. BRADLEY, R. C. MEHROTRA, and D. P. GAUR entitled *Metal Alkoxides*, at pages 150 to 162.

The structure of the polymers depends closely on the value of the molar ratio of the initial reagents, the nature of the radicals bonded to the titanium atom and the operating conditions of the hydrolysis. The structure comprises evidently Ti—O—Ti bonds and radicals bound to the titanium atom, which are from among the group formed by the radicals of the formulae G$_3$SiO—, G'—, R$^8$COO—, and HO—, with the symbols G, G' and R$^8$ being the symbols of the formulae F$^5$ and F$^6$. It is necessary, however, that these polymers be on the one hand stable in storage and on the other hand soluble in conventional organic solvents, such as toluene, xylene, and cyclohexane. It is preferable that at least 50 parts of these polymers be soluble in 100 parts of the solvent.

The hardening catalysts usable according to the invention further comprise organic derivatives of zirconium, which carry per zirconium atom at least one organic radical bound to the said zirconium atom by a ZrOC bond, which does not include the ZrOCO— bond. Unsatisfied valences of the zirconium atom are satisfied by radicals chosen from the group of hydroxyl radicals, oxygen atoms via Zr—O—Zr bonds, and/or chelating bonds.

Preferably, the organic zirconium derivatives are selected from the compounds of the following formula [hereinafter referred to as F$_9$]: Zr[OCH$_2$CH$_2$)$_b$OR$^4$]$_4$, in which the symbols R$^4$ and b have the significance of the symbols R$^4$ and b of the formulae F$_5$ and F$_6$.

Derivatives of the formula F$_9$ may be exemplified by the following:
Zr(OC$_2$H$_5$)$_4$
Zr[OCH(CH$_3$)$_2$]$_4$
Zr(O—nC$_3$H$_7$)$_4$
Zr(O—n.C$_4$H$_9$)$_4$
Zr[(OC(CH$_3$)$_3$]$_4$
Zr(OCH$_2$CH$_2$OCH$_3$)$_4$
Zr[OCH$_2$(C$_2$H$_5$)(CH$_2$)$_3$CH$_3$]$_4$
Zr(O—nC$_{17}$H$_{35}$)$_4$ The foregoing are known compounds and are easy to prepare, as indicated on pages 20 and 30 of the aforecited work by D. C. BRADLEY, R. C. MEHROTRA and D. P. GAUR entitled *Metal Alkoxides*.

The organic zirconium derivatives may further comprise the products of the partial hydrolysis of the preceding compounds of formula F$_9$. These are polyzirconates with a little known, highly complex structure. The structure closely depends upon the degree of hydrolysis and the nature of the radicals —(OCH$_2$CH$_2$)$_b$OR$^4$ bound to the zirconium atom.

It is necessary, however, that the polymers be liquid, stable and soluble in conventional hydrocarbon solvents, such as toluene, xylene, and methylcyclohexane. It is preferable that at least 50 parts of these polymers be soluble in 100 parts of hydrocarbon solvents. Information concerning the structure of the polyzirconates is found in the aforecited work of D. C. BRADLEY, R. C. MEHROTRA and D. P. GAUR entitled *Metal Alkoxides*, in particular on pages 163 and 164.

Fillers (D) are used in a proportion of from 5 to 150 parts, and more preferably from 8 to 100 parts, per 100 parts of the α,ω-dihydroxydiorganopolysiloxane polymers (A). The fillers may be present in the form of very finely distributed products, with an average particle diameter of less than 0.1 m. Preferred fillers include pyrogenic silica and precipitated silica, with their specific surface area being generally higher than 40 m$^2$/g.

The fillers may also be present in the form of more coarsely divided products, with an average particle diameter larger than 0.1 m. Examples of such fillers include ground quartz, diatomaceous earth, calcium carbonate, calcined clay, titanium oxide of the rutile type, iron, zinc, chromium, zirconium, magnesium oxides, the different forms of alumina (whether hydrated or not), boron nitride, lithopon, and barium metaborate. Their specific surface is generally less than 30 m$^2$/g.

The fillers (D) may also be surface modified by treatment with the different organosilicon compounds conventionally employed for this application. These organosilicon compounds may be organochlorosilanes, diorganocyclopolysiloxanes, hexaorganodisiloxanes, hexaorganodisilazanes or diorganocyclopolysilazanes. Note, for example, FR. No. 1,126,884; FR No. 1,136,885; FR No. 1,236,505; and British No. 1,024,2340. The treated fillers comprise, in the majority of the cases, from 3 to 30% by weight of the organosilicon compounds.

The fillers (D) may consist of a mixture of different types of fillers with different grain sizes. Thus, for example, they may consist of 30 to 70% of finely divided silica with a specific surface greater than 40 m$^2$/g and 70 to 30% of more coarsely divided silica with a specific surface of less than 30 m$^2$/g.

The organopolysiloxane compositions of the present invention may comprise, in addition to the aforementioned components A, B, C and D, the usual adjuvants and additives, including, in particular, heat stabilizers. The latter products, which by their presence improve the heat resistance of silicone elastomers, may be selected from among the salts, oxides and hydroxides of rare earths, and more specifically from among cerium oxides and hydroxides or the oxides of titanium and iron obtained preferably by combustion. Advantageously, the compositions according to the present invention preferably contain from 0.1 to 15 parts and preferably 0.15 to 12 parts of the heat stabilizers per 100 parts of the α,ω-dihydroxydiorganopolysiloxanes (A).

Further to the principal components A, B, C, D and the aforecited additives, certain particular organopolysiloxane compounds may be introduced in order to affect the physical characteristics of the compositions according to the invention and/or the mechanical properties of the elastomers resulting from the hardening of the compositions. These organopolysiloxane compounds are well known. They include more specifically:

(1f) α,ω-bis(triorganosiloxy)diorganopolysiloxane polymers and/or α-(hydroxy)ω-(triorganosiloxy)diorganopolysiloxane polymers with a viscosity of 10 mPa.s at 25° C., formed essentially of diorganosiloxyl units and at least 1% of monoorganosiloxyl and/or siloxy units, organic radicals bonded to silicon atoms, being chosen from methyl, vinyl, phenyl radicals, 60% at least of these organic radicals being methyl radicals and 10% at the most being vinyl radicals. The viscosity of these polymers may amount to several tens of millions of mPa.s at 25° C., they thus include the spectrum of fluid to viscous oils and soft to hard gums. They are prepared by conventional methods, described more specifically in FR No. 978,058, FR No. 1,25,150, FR No. 1,108,764, and FR No. 1,370,884. Preferably, α,ω-bis(trimethylsiloxy)dimethylpolysiloxane oils having a viscosity of from 10 mPa.s to 1000 mPa.s at 25° C. are used. These polymers may be introduced in a proportion of 150 parts maximum, and preferably from 5 to 120 parts, per 100 parts of the α,ω-di(hydroxy)diorganopolysiloxane (A).

(2f) Branched, liquid methylpolysiloxane polymers having from 1.4 to 1.9 methyl radical per silicon atom and comprising a combination of units of the formulae $(CH_3)_3SiO_{0.5}$, $(CH_3)_2SiO$ and $CH_3SiO_{1.5}$. They contain from 0.1 to 8% hydroxyl groups. They may be obtained by the hydrolysis of the corresponding chlorosilanes, as taught in FR No. 1,408,662 and FR No. 2,429,811. Preferably, branched polymers with their units distributed in the following manner, are used:

$(CH_3)_3SiO_{0.5}/(CH_3)_2SiO = 0.01$ to 0.15 and $CH_3SiO_{1.5}/(CH_3)_2SiO = 0.1$ to 1.5

These polymers may be introduced in a proportion of 70 parts maximum, and more preferably from 3 to 50 parts, per 100 parts of the α,ω-di(hydroxy)diorganopolysiloxane (A) polymers.

(3f) Diorganopolysiloxane oils blocked by hydroxyl and/or alkoxyl groups having from 1 to 4 carbon atoms, of low viscosity in general within a range of 2 mPa.s to 4,000 mPa.s at 25° C. (if these oils are blocked solely by hydroxyl groups, their viscosity is less than 700 mPa.s at 25° C.). Organic radicals bound to the silicon atoms of these oils are, as before, selected from among methyl, vinyl, and phenyl radicals, 40% at least of which are methyl radicals and a maximum of 10% being vinyl radicals.

As suitable lower chain blocking alkoxyl groups the following exemplify same: the methoxy, ethoxy, isopropyl, n-propoxyl, n-butoxyl, isobutoxyl and tertiobutoxyl groups. The proportion of hydroxyl and/or alkoxyl groups is generally 0.5 to 20%. These oils are prepared by conventional methods described more precisely in FR No. 938,292, FR No. 1,104,674, FR No. 1,116,196, FR No. 1,278,281, and FR No. 1,276,619. Preferably, α,ω-dihydroxydimethylpolysiloxane oils with a viscosity of 10 to 300 mPa.s at 25° C., or, -dimethoxy(or diethoxy)dimethylpolysiloxane oils with a viscosity of 30 to 2,000 mPa.s at 25° C., are used. They may be introduced at a rate of 50 parts maximum, and more preferably from 2 to 40 parts, per 100 parts of the α,ω-di(hydroxy)diorganopolysiloxane polymers (A).

(4f) Organosilicon hydroxyl compounds selected from compounds corresponding to the general formula $Z'SiZ_2(OSiZ_2)_wOH$ which are solid at ambient temperatures. In this formula the symbols Z, which may be identical or different, represent the methyl, ethyl, n-propyl, vinyl, or phenyl radicals, the symbol Z' represents a hydroxyl radical or Z, and the symbol w represents zero, 1 or 2. As examples of the foregoing compounds, the following may be cited, e.g., diphenylsilane diol, methylphenylsilanediol, dimethylphenylsilanol, tetramethyl-1,1,3,3-disiloxanediol, dimethyl-1,3-diphenyl-1,3-disiloxanediol, tetramethyl-1,1,5,5-diphenyl-3,3-trisiloxanediol. They may be introduced in a proportion of 30 parts maximum, and more preferably from 0.5 to 20 parts, per 100 parts of the α,ω-di(hydroxy)diorganopolysiloxane polymers (A).

The α,ω-bis(triorganosiloxy)diorganopolysiloxane and/or the α-(hydroxy)ω-(triorganosiloxy)diorganopolysiloxane polymers described under (1f), may be replaced entirely or partially by organic compounds that are inert with respect to the components A, B, C, D and miscible at least with the α,ω-di(hydroxy)diorganopolysiloxane polymers (A). As examples of such suitable organic compounds, the following may be mentioned, i.e., polyalkylbenzenes obtained by the alkylation of benzene with the aid of long chain olefins, in particular the olefins with 12 carbon atoms originating in the polymerization of propylene. Organic compounds of this type are described for example in FR No. 2,392,476 and FR No. 2,446,849.

To prepare compositions according to the present invention, it is recommended to use an apparatus permitting the intimate mixing, with or without heating, of the components A, B, C and D, while excluding humidity (water moisture). Eventually, the aforecited additives and adjuvants would also have to be mixed in with the other components.

All of the ingredients may be charged into the apparatus in any order of introduction. It is thus possible to mix first the α,ω-dihydroxydimethylpolysiloxane oils (A) and the fillers (D) and then add the paste obtained from the cross-linking agents (B) and the catalysts (C).

It is equally possible to mix the oils (A) and the cross-linking agents (B) and to add the fillers (D) and the catalysts (C) subsequently to the products of the homogeneous reaction of these 2 components (A) and (B). In the course of these operations, the mixtures may be heated to a temperature within the range of from 50°–180° C., under atmospheric pressure or under a reduced pressure to favor the removal of volatile materials such as water, low molecular weight polymers, organic acids and oximes.

The compositions obtained in this manner may be used as they are, or in the form of dispersions in an organic diluent. Suitable diluents preferably are conventional, commercially available products, chosen from among, for example, aliphatic, cycloaliphatic, aromatic hydrocarbons, which are optionally halogenated, such as n-heptane, n- octane, cyclohexane, methylcyclohexane, toluene, xylene, mesitylene, cumene, tetraline, perchloroethylene, trichloroethane, te rachloroethane, chlorobenzene, and orthodichlorobenzene;

aliphatic or cycloaliphatic ketones, such as methylethylketone, methylisobutylketone, cyclohexanone, and isophorone; and esters such as ethyl acetate, butyl acetate, and ethylglycol acetate.

The quantities of the diluents introduced must be sufficient to obtain stable dispersions which are spread easily over substrates. Such quantities depend essentially on the nature and viscosity of the initial organopolysiloxane compositions. They may vary within large proportions, nevertheless, it is recommended to prepare dispersions containing from 15 to 85% by weight of the diluents.

The compositions according to the invention, used as they are or in the form of dispersions, are stable in storage in the absence of water, and harden at ambient temperatures (after the removal of the solvents in the case of dispersions) in the presence of water to form elastomers.

Upon depositing the subject compositions as they are on solid substrates, in a humid atmosphere, it is found that their hardening into elastomers takes place from the outside to the inside of the mass deposited. Initially, a skin forms on the surface, followed by cross-linking in depth. The complete formation of the skin, indicated by a nonadhesive touch of the surface, requires a period of time within a range of one minute to 55 minutes. This period depends on the proportion of relative humidity in the atmosphere surrounding the compositions and the cross-linking capability of the compositions themselves.

The hardening in depth of the layers deposited sufficient to permit their removal and the manipulation of the elastomers formed requires a longer period of time. In effect, this period depends not only on the aforementioned factors for the formation of a nonadhesive touch, but also on the thickness of the layers deposited, said thickness ranging generally between 0.5 mm and several centimeters. This longer period of time can range from 10 minutes to 15 hours.

The compositions are capable of adhering, once hardened into elastomers, to any substrate without the preliminary deposition of an anchoring agent. More precisely, adherence is particularly effective on glass substrate or on substrates of any kind covered with layers of paint when the compositions used contain acid cross-linking agents of formula $F_1$.

Nevertheless, if the substrates covered with the elastomers (with the exception of the substrate-elastomer couples mentioned hereinabove), are exposed to thermal, mechanical or other high stresses, it is recommended to apply an anchoring (or priming) agent, which most frequently consists of a solution of organosilicon and/or titanium compounds. See, for example, FR No. 1,199,509 and FR No. 1,208,255.

The compositions may be used in numerous applications, such as grouting in the construction industry; the joining of a great variety of materials, e.g., (metals, plastic substances, natural rubbers, synthetic rubbers, wood, cardboard, faience, bricks, ceramics, glass, stone, concrete, and elements of masonry; the insulation of electric conductors; the embedding of electronic circuits; and, the preparation of molds for the production of articles of synthetic resins or foams.

The aforementioned dispersions of the compositions in diluents may be used most suitably for the impregnation of thin layers of woven or unwoven articles, the coating of thin sheets of metal, plastics or cellulose. The dispersions may be projected, for example, by pulverization via a paint gun, onto any substrate on which it is necessary to obtain a coating of the thickness on the order of 5 to 300 m. After the projection of the dispersions, the diluents evaporate and the compositions released harden into a perfectly uniform rubber film. The hardening time usually is between 5 minutes and several hours, but generally not exceeding 10 hours. This duration depends on the factors cited in connection with the duration of the hardening of compositions deposited in thicker layers and also on the velocity at which the solvents evaporate. This method of deposition by pulverization is very practical for the coating of a thin film on a very large surface, and more specifically the hulls of ships. The deposition of an antiadherent silicone film on the surfaces of vessels in contact with sea water prevents the fouling of these surfaces due to the attachment and development of marine organisms, such as algae, barnacles, oysters, and ascidia. This application is described, for example, in U.S. Pat. No. 3,702,778. The presence of a film of a silicone elastomer, resulting from the hardening of the compositions of the invention on the hull of vessels, however, offers in addition to the advantage of being antiadherent with regard to marine organisms, the further advantage of not releasing in the course of its leaching by sea water, toxic components, and in particular the organic tin salts of carboxylic acids.

Furthermore, this elastomeric film may serve as an antiadherent, inert, nontoxic coating for different substrates in contact with food products, such as (1) wrapping papers for confections or frozen meats, (2) metal vessels useful in the preparation of ice cream and sherbet and (3) metal pans in which bread dough is placed and shaped and which is introduced together with its contents into the oven to bake the bread. It may further be used as an antiadherent and nontoxic coating for materials in contact with the human body, such as compresses and special dressings for burns.

The following examples will serve to illustrate the invention. It should be understood, however, that the specific details set forth in the examples are merely illustrative and in nowise limitative. All parts and percentages in the examples and the remainder of the specification are by weight unless otherwise specified.

PREPARATION OF THE TITANIUM DERIVATIVES

1—Trimethylsiloxytitanium of the formula
$Ti[OSi(CH_3)_3]_4$

One mole of isopropyl titanate of the formula $Ti[OCH(CH_3)_2]_4$ and 400 cm$^3$ of methylcyclohexane were placed in a reactor and the entirety heated to boiling. Into this mixture, progressively over a period of 4 hours, were poured 4 moles of trimethylacetoxysilane of the formula $(CH_3)_3SiOCOCH_3$. During this addition the isopropyl acetate was eliminated from the reaction medium by appropriate heating at the rate it was formed, this compound distills in a mixture with methylcyclohexane.

The synthesis of isopropyl acetate was in keeping with the following reaction scheme;

Ti[OCH(CH$_3$)$_2$]$_4$+4(CH$_3$)$_3$SiOCOCH$_3$
→Ti[OSi(CH$_3$)$_3$]$_4$+4CH$_3$COOCH(CH$_3$)$_2$

Following the completion of the formation of the isopropyl acetate, the residual product was rectified. The compound of the aforecited formula Ti[OSi(CH$_3$)$_3$]$_4$ was recovered, which distilled at 78° C. under 14 Pa.

2-Trimethylsiloxytitanium of the formula [CH$_3$(CH$_2$)$_3$O]$_2$Ti[OSi(CH$_3$)$_3$]$_2$ The preceding method was used again as follows: One mole of n-butyl titanate and 400 cm$^3$ methylcyclohexane were placed in the reactor and the mixture heated to boiling. Into this mixture, progressively over 4 hours, 2 moles of trimethylacetoxysilane were added and n-butyl acetate was eliminated from the reaction medium at the rate it was formed.

The synthesis of n-butyl acetate was in accordance with the following reaction scheme:

Ti[O(CH$_2$)$_3$CH$_3$]$_4$+2(CH$_3$)$_3$SiOCOOCH$_3$→[CH$_3$(-CH$_2$)$_3$O]$_2$Ti[OSi(CH$_3$)]$_2$+2CH$_3$COO(CH$_2$)$_3$CH$_3$

Upon completion of the formation of n-butyl acetate, the residual product was rectified. The compound of the formula given hereinabove, [CH$_3$(CH$_2$)$_3$O]$_2$Ti[OSi(CH$_3$)$_3$]$_2$ was recovered, which distilled at 75° C. under 133 Pa.

3—Polytitanoxane carboxylate consisting of units of the formula:
—OTi[OCH(CH$_3$)$_2$][OCOCH(C$_2$H$_5$)(CH$_2$)$_3$CH$_3$]—

0.1 mole of isopropyl titanate and 0.2 mole of ethyl-2 hexanoic acid were introduced into a reactor. The mixture was heated to 90° C. over 2 hours and the volatile products were eliminated progressively from the reaction medium under reduced pressure. The heating was discontinued when the temperature attained 150° C. At this temperature, the pressure was on the order of 66 Pa.

The volatile products included isopropanol and isopropyl ethyl-2-hexanoate. The synthesis of these products followed the simplified reaction scheme of:

Ti[OCH(CH$_3$)$_2$]$_4$+2CH$_3$(CH$_2$)$_3$CH(C$_2$H$_5$)COOH-
→[OTi[OCH(CH$_3$)]$_2$][OCOCH—(C$_2$H$_5$)(CH$_2$)$_3$-CH$_3$]+CH$_3$(CH$_2$)$_3$CH(C$_2$H$_5$)COOCH(CH$_3$)$_2$+(-CH$_3$)$_2$CHOH

The residual product was thus a polymer comprised principally of a succession of units of the aforecited formula, i.e.:

[OTi[OCH(CH$_3$)]$_2$[OCOCH(C$_2$H$_5$)(CH$_2$)$_3$CH$_3$]

4—Polytitanoxane carboxylate consisting of units of the formula: [OTi[OCOCH(C$_2$H$_5$)(CH$_2$)$_3$CH$_3$]$_2$]

The mode of operation was similar to the one described under (3):

In a reactor, 0.1 mole of isopropyl titanate and 0.3 mole of ethyl-2-hexanoic acid were introduced. The mixture was heated to 90° C. in 2 moles and then the volatile products were eliminated by progrssive heating under reduced pressure. The rise in temperature was arrested when the reaction mixture reached 155° C. At this temperature the pressure was on the order of 40 Pa. The volatile products contained isopropyl ethyl-2 hexonate and isopropanol. Their synthesis followed the simplified reaction scheme:

Ti[OCH(CH$_3$)$_2$]$_4$+3CH$_3$(CH$_2$)$_3$(C$_2$H$_5$COOR)→O-Ti[OCOCH(C$_2$H$_5$)(CH$_2$)$_3$CH$_3$]$_2$+CH$_3$(CH$_2$)$_3$-CH—(C$_2$H$_5$COOCH(CH$_3$)$_2$+3(CH$_3$)$_2$CHOH

The residual product was thus a copolymer comprised principally of a succession of units of the aforecited formula, i.e.:

[OTi]OCOCH(C$_2$H$_5$)(CH$_2$)$_3$CH$_3$[$_2$]

5—Titanium carboxylate of the formula: (CH$_3$)$_2$CHOTi[OCOCH(C$_2$H$_5$)(CH$_2$)$_3$CH$_3$]$_3$ 0.2 mole of isopropyl titanate was introduced and heated to 110° C. in a reactor, whereupon progressively over a period of 2 hours, 0.6 mole of ethyl-2-hexanoic acid was added. In the course of the addition, isopropyl alcohol was distilled off at the rate of its formation.

The residue comprised prncipally a titanium carboxylate of the formula:

(CH$_3$)$_2$CHOTi[(C$_2$H$_5$)(CH$_2$)$_3$CH$_3$]$_3$

6—Titanium carboxylate of the formula: (CH$_3$)$_2$CHOTi(OCOC$_{17}$H$_{35}$)$_3$ The process steps described under (5) were followed, but the 0.6 mole of ethyl-2-hexanoic acid was replaced with 0.6 mole of isostearic acid. After the removal of the isopropyl alcohol formed, mainly titanium carboxylate of the following formula remained:

(CH$_3$)$_2$CHOTi(OCOC$_{17}$H$_{35}$)$_3$

7—Titanium chelate of the formula: [CH$_3$(CH$_2$)$_3$O]$_2$Ti[OC(CH$_3$)=CHCOCH$_3$]$_2$ In a reactor, 0.2 mole of n-butyl titanate and 0.4 mole of acetyl-acetone were introduced and the mixture agitated for 30 minutes. The contents of the reactor were then heated progressively to 80° C. under reduced pressure. At this temperature the pressure was approximately 2000 Pa.

During his heating n-butanol was eliminated. The residual product comprised of a chelate of the formula

[CH$_3$(CH$_2$)$_3$O]$_2$Ti[OC(CH$_3$)=CH—COCH$_3$]$_2$

Preparation of the organopolysiloxane compositions

EXAMPLE 1

In a mixer, the following were introduced:
88 parts of an α,ω-dihydroxymethylpolysiloxane oil with a viscosity of 3500 mPa.s at 25° C.,
20 parts of a pyrogenic silica with a specific surface of 200 m$^2$/g treated with octamethylcyclotetrasiloxane,
20 parts of ground quartz with an average particle diameter of 5 m, and,
0.65 part of pyrogenic titanium oxide with a specific surface of 50 m$^2$/g.

The contents of the mixer were mixed for 2 hours at a temperature of 140° C. under a pressure of 2600 Pa.

Into the mixture upon cooling to 50°–60° C., 0.65 part of lamp black with a specific surface of 260 m$^2$/g and 6 parts of methyltriacetoxysilane were introduced. The lamp black was used in the form of a 5% paste in α,ω- dihydroxydimethylpolysiloxane, with a viscosity of 3500 mPa.s at 25° C.

The contents of the mixer were mixed for 1 hour and 30 minutes. Subsequently, 0.02 parts of n-butyl titanate and 80 parts of cyclohexane were added. The mixture was agitated for 1 hour and 30 min. The homogeneous dispersion obtained was filtered, then placed in a vessel sealed against humidity. The dispersion had a viscosity on the order of 5000 mPa.s at 25° C.

After 6 months of storage, no significant variation of the viscosity of the dispersion was noted. The dispersion was diluted with cyclohexane so as to obtain a new dispersion having a 50% dry extract. This new dispersion, with a viscosity essentially of 500 mPa.s at 25° C., was placed into the reservoir of a paint spray gun, and then projected by pulverization onto a degreased sheet of aluminum.

One hour after the completion of the application of the dispersion, a completely hardened, uniform coating with an approximate thickness of 100 μm was obtained.

The preceding experiment was reproduced by following the same procedure and using the same components except replacing the n-butyl titanate with dibutyl-tin dilaurate. It was found that in order to obtain a coating thickness of 100 μm which was completely hardened in 1 hour, it was necessary to use 0.05 parts of the tin salt.

EXAMPLE 2

The following were introduced into a mixer:
100 parts of a α,ω-dihydroxydimethylpolysiloxane oil having a viscosity of 80 000 mPa.s at 25° C.,
16 parts of a methylpolysiloxane oil with a viscosity of 60 mPa.s at 25° C., having 0.9% hydroxyl groups bound to silicon atoms, consisting of $(CH_3)_3SiO_{0.5}/(CH_3)_2SiO$ and $CH_3SiO_{1.5}$ units distributed so that a ratio of $(CH_3)_3SiO_{0.5}/(CH_3)_2SiO$ of 0.04 and a ratio of $CH_3SiO_{1.5}/(CH_3)_2SiO$ of 0.4 were obtained,
14 parts of a pyrogenic silica with a specific surface of 200 m²/g treated with octamethylcyclotetrasiloxane.

The mixture was agitated at 150° C. for 2 hours; in the course of this operation a flow of anhydrous nitrogen swept the atmosphere of the mixer.

After cooling the contents of the mixer to 60° C., 6 parts of methyltriacetoxysilane and x parts of a hardening catalyst were introduced into the mixer. The mixture was agitated for 1 hour. The self-vulcanizing composition obtained was then placed in an air tight metal container. To determine the rapid hardening capacity in ambient air into an elastomer of this composition, it was spread with the aid of a squeegee in a layer of 1.5 mm in thickness onto a sheet of polyethylene previously treated with a commercial anionic surface active agent. This agent comprised the sodium salt of an alkyl sulfate, the alkyl group of which is branched and has 12 carbon atoms.

The period of time was noted after which the surface of the layer deposited was no longer adhesive. This measurement was effected by means of a wooden rod which was placed into contact with the layer deposited. Whether a significant adhesion existed between the rod and the layer was then determined. This measure was designated the nonsticky time. It was further noted timewise when the layer deposited into a rubber film was sufficiently coherent and tough to be lifted without breaking from the polyethylene sheet. This measure was designated the stripping time of the film.

The table hereinbelow compiles the values of the nonsticky times and the film stripping times of the above compositions in which successive hardening compositions consisting of derivatives of titanium and zirconium, and as a comparison tin, were used. The nature of these catalysts and the quantity x used are also indicated in the table:

| HARDENING CATALYST | Catalyst quantity (x) part | Non-sticky time min. | Stripping time min. |
|---|---|---|---|
| N—butyl titanate of formula $Ti(O-n\ C_4H_9)_4$ | 0.003 | 11 | 30 |
| Trimethylsiloxytitanium of formula $Ti[OSi(CH_3)_3]_4$ | 0.006 | 12 | 22 |
| Trimethylsiloxytitanium of formula $[CH_3(CH_2)_3O]_2Ti[OSi(CH_3)_3]_2$ | 0.006 | 11 | 25 |
| Polytitanoxane carboxylate comprised of units of formula (x) | 0.006 | 12 | 35 |
| Polytitanoxane carboxylate comprised of units of the formula $-\{OTi[OCOCH(C_2H_5)(CH_2)_3CH_2]_2\}-$ | 0.006 | 13 | 35 |
| Titanium carboxylate of formula (xx) | 0.006 | 10 | 45 |
| Titanium carboxylate of formula $(CH_3)_2CHOTi(OCOC_{17}H_{35})_3$ | 0.006 | 10 | 55 |
| Titanium onelate of formula (xxx) | 0.006 | 9 | 25 |
| Triethanolamine titanate | 0.006 | 11 | 30 |
| N—propyl zirconate of formula $Zr(O-n\ C_3H_7)_4$ | 0.006 | 3 | 20 |
| N—butyl zirconate of formula $Zr(O-n\ C_4H_9)_4$ | 0.006 | 4 | 20 |
| Dibutyl-tin dilaurate of formula $(n\ C_4H_9)_2Sn(OCOC_{11}H_{23})_2$ | 0.017 | 9 | 31 |
| (1) Compound with Ti—O—Sn bonds, with a viscosity of 17 mPa · s at 25° C., solidifying at −14° C., prepared in accordance with the example of US 3 409 573 | 0.006 0.013 | 20 10 | 100 26 |

(x) $-\{[OTi[OCH(CH_3)_2][OCOCH(C_2H_5)(CH_2)_3CH_3]\}-$
(xx) $(CH_3)_2CHOTi[OCOCH(C_2H_5)(CH_2)_3CH_3]_3$
(xxx) $[CH_3(CH_2)_3O]_2Ti[OC(CH_3)=CH-COCH_3]_2$ The last two compounds of the table were used as comparisons.

The values assembled in the table show that the derivatives of titanium or zirconium, which characterize the present invention, are easily capable of replacing, the tin derivatives or the Ti—O—Sn bonds used heretofore while using amounts of two times less material.

EXAMPLE 3

The following were introduced into a mixer:
100 parts of a α,ω-dihydroxydimethylpolysiloxane oil with a viscosity of 18,000 mPa.s at 25° C.,
18 parts of an α,107 -bis(trimethylsiloxy)dimethylpolysiloxane gum with a viscosity of 40,000 mPa.s at 25° C.,
6 parts of an α,107 -dihydroxymethylphenylpolysiloxane oil with a viscosity of 350 mPa.s at 25° C.,
12 parts of pyrogenic silica with a specific surface of 200 m²/g, and
12 parts of lithopone with an average particle diameter of the order of 1 μm.

The mixture was agitated for 4 hours at 150° C. During this operation the atmosphere of the mixer was swept by a flow of dry nitrogen.

After cooling the mixture to 50° C., 8.5 parts of the cross-linking agent of the following formula were introduced into the mixer:

$CH_2=CHSi[ON=C(C_2H_5)CH_3]_3$ and 0.01 parts of n-butyl titanate. The mixture was agitated for 2 hr. The self-vulcanizing composition obtained was placed in humidity tight aluminum containers.

To determine the hardening capability in ambient air, the method described for Example 2 was followed. Thus, films with a thickness of 1.5 mm were prepared and the time to nonstickiness and stripping measured. A nonsticking time of 35 min and a stripping time of 5 hours were found.

The same experiment was reproduced, except that the n-butyl titanate was replaced by di(n-butyl)-tin diacetate. It was found that in order to obtain the aforementioned nonsticking and stripping times, as least 0.04 parts of this tin salt must be used.

While the invention has now been described in terms of various preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A single component organopolysiloxane composition which is stable in storage in the absence of water and which comprises a mixture of the following:
   (A) 100 parts of a polysiloxane consisting essentially of a $\alpha,\omega$-dihydroxydiorganopolysiloxane having a viscosity of from 700 to 1,000,000 mPa.s at 25° C., comprising a succession of diorganosiloxy units of the formula $R_2SiO$ in which the symbols R, which can be identical or different, represent hydrocarbon radicals having from 1 to 8 carbon atoms and which are optionally substituted with halogen atoms or cyano groups,
   (B) 2 to 25 parts of a cross-linking agent of the formula $R_aSi(OCOR^1)_{4-a}$ and/or the formula $R_{a'}Si(ON=CR^2_2)_{4-a''}$ wherein the symbols R have the significance given in (A), the symbol $R^1$ represents a hydrocarbon radical free of aliphatic unsaturation and having from 1 to 15 carbon atoms, the symbols $R^2$, which can be identical or different, represent alkyl radicals having from 1 to 8 carbon atoms, and the symbols a and a' represent zero or one,
   (C) 0.0004 to 0.095 parts of a hardening catalyst, and
   (D) 5 to 150 parts of mineral fillers, wherein the composition is further characterized in that the hardening catalyst (C) comprises either an organic derivative of titanium or an organic derivative of zirconium selected from:
   (i)(a) organic titanium derivatives which comprise for each titanium atom at least one organosilicon radical bound to said titanium atom by a Ti—O—Si bond, with the other valences being satisfied by radicals from the group comprising Ti—O—C bonds, hydroxyl radicals, oxygen atoms of Ti—O—Ti bonds or chelation bonds, or,
   (i)(b) organic titanium derivatives which comprise for each titanium atom at least one organic radical bound to said atom by a Ti—O—C bond, with the remaining valances of the titanium atom being satisfied by radicals of the group comprising hydroxyl radicals, oxygen atoms of Ti—O—Ti bonds or chelation bonds, or,
   (ii) organic zirconium derivatives which comprise for each atom of zirconium at least one organic radical bound to said zirconium atom by a Zr—O—C bond, but with the proviso that there are no Zr—OCO-bonds originating from a carboxylic acid residue, with the remaining valences of the zirconium atom being satisfied by radicals of the groups comprising hydroxyl radicals, oxygen atoms of Zr—O—Zr bonds or chelation bonds.

2. A composition in accordance with claim 1, wherein the titanium derivatives (i)(a) are compounds of the general formula $$(G_3SiO)_{4-x}Ti(G')_x,$$

wherein
the symbols G, being identical or different, represent hydrocarbon radicals having from 1 to 8 carbon atoms, alkoxy radicals having from 1 to 4 carbon atoms, or $\beta$-methoxyethoxyls,
the symbols G' represent a radical of the group formed by compounds of the formulae:
$(OCH_2CH_2)_bOR^4$,
$OC(Q')=C(R^5)COQ$, and
where two G' radicals may together constitute the divalent radical of the formula:

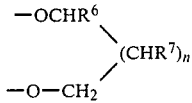

wherein the divalent radical is attached by its 2 valences to the titanium atom, with
the symbol $R^4$ representing an alkyl radical having from 1 to 12 carbon atoms,
the symbol b representing zero or one, with the proviso that when the symbol b represents zero, the alkyl radical $R^4$ has from 2 to 12 carbon atoms and when the symbol b represents 1, the alkyl radical $R^4$ has from 1 to 3 carbon atoms,
the symbol Q representing a hydrogen atom, an alkyl radical having from 1 to 4 carbon atoms, a phenyl radical, an alkyl radical having from 1 to 5 carbon atoms, or a dialkylamino radical having alkyl groups bound to the nitrogen atom with 1 to 4 carbon atoms,
the symbol $R^5$ representing a hydrogen atom, a methyl radical, a chloromethyl radical, or an acetyl radical,
the symbol Q' representing an alkyl radical having from 1 to 5 carbon atoms or a chloromethyl radical,
the symbols $R^6$ and $R^7$, being identical or different, representing hydrogen atoms or methyl radicals,
the symbol n representing zero, 1 or 2, and
the symbol x representing zero, 1, 2 or 3.

3. A composition in accordance with claim 1 wherein the titanium derivatives (i)(b) are compounds of the general formula:

$$(G')_yTi(OCOR^8)_{4-y},$$

wherein
the symbols G' represent a radical of the group formed by compounds of the formulae:
$(OCH_2CH_2)_bOR^4$,
$OC(Q')=C(R^5)COQ$, and where two G' radicals may together constitute the divalent radicals of the formula:

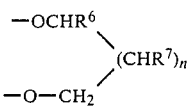

wherein the divalent radical is attached by its 2 valences to the titanium atom, with the symbol $R^4$ representing an alkyl radical having from 1 to 12 carbon atoms, the symbol b representing zero or one, with the proviso that when the symbol b represents zero, the alkyl radical $R^4$ has from 2 to 12 carbon atoms and when the symbol b represents 1, the alkyl radical $R^4$ has from 1 to 3 carbon atoms, the symbol Q representing a hydrogen atom, an alkyl radical having from 1 to 4 carbon atoms, a phenyl radical, an alkyl radical having from 1 to 5 carbon atoms, or a dialkylamino radical having alkyl groups bound to the nitrogen atom with 1 to 4 carbon atoms, the symbol $R^5$ representing a hydrogen atom, a methyl radical, a chloromethyl radical, or an acetyl radical, the symbol Q' representing an alkyl radical having from 1 to 5 carbon atoms or a chloromethyl radical, the symbols $R^6$ and $R^7$, being identical or different, representing hydrogen atoms or methyl radicals, the symbol n representing zero, 1 or 2, the symbol y represents an integer or fractional number ranging from zero to four, and the symbol $R^8$ represents a hydrocarbon radical having from 1 to 20 carbon atoms.

4. A composition in accordance with claim 1 wherein the titanium derivatives (i)(b) are polytitanoxanes comprised of a succession of units of the formula:

$$—Ti(OCOR^8)_{y'}[(OCH_2CH_2)_bOR^4]_{2-y'}O—$$

wherein $R^8$ is a hydrocarbon radical having from 1 to 20 carbon atoms, $R^4$ is a hydrocarbon radical having from 1 to 12 carbon atoms, b is zero or one, with the proviso that when b is zero $R^4$ has from 2 to 12 carbons and when b is one $R^4$ has from 1 to 3 carbons, and Y' is 1 or 2.

5. A composition in accordance with claim 1, wherein the titanium derivatives (i)(b) are alkanolamine titanates.

6. A composition in accordance with claim 2, wherein the titanium derivatives (i)(a) comprise partial hydrolysis products of the compounds of the formula $(G_3SiO)_{4-x}Ti(G')_x$.

7. A composition in accordance with claim 3, wherein the titanium derivatives (i)(b) are partial hydrolysis products of the compounds of the formula $(G')_yTi(OCOR^8)_{4-y}$.

8. A composition in accordance with claim 1, wherein the organic derivatives of zirconium are compounds of the formula $$Zr[(OCH_2CH_2)_bOR^4]_4$$

wherein $R^4$ is a hydrocarbon having from 1 to 12 carbon atoms and b is zero or one, with the proviso that when b is zero $R^4$ has from 2 to 12 carbons and when b is one $R^4$ has from 1 to 3 carbons.

9. A composition in accordance with claim 8, wherein the organic derivatives of zirconium comprise partial hydrolysis products of the compounds of the formula $Zr[(OCH_2CH_2)_bOR^4]_4$.

* * * * *